ELECTRON TUBE APPARATUS HAVING PARTICULAR CATHODE-CONTROL
GRID BIAS CIRCUIT CONFIGURATION
Filed June 1, 1965

Inventor
ROBERT W. HANSON
By
Nicholas A. Camasto
Atty.

United States Patent Office 3,363,053
Patented Jan. 9, 1968

3,363,053

ELECTRON TUBE APPARATUS HAVING PARTICULAR CATHODE-CONTROL GRID BIAS CIRCUIT CONFIGURATION

Robert W. Hanson, Glendale Heights, Ill., assignor to Admiral Corporation, Chicago, Ill., a corporation of Delaware Filed June 1, 1965, Ser. No. 460,311
7 Claims. (Cl. 178—5.8)

ABSTRACT OF THE DISCLOSURE

A television audio output stage having a "force biased" unbypassed cathode and a grid biased from a quadrature detector suppressor grid. The relative biases are proportioned to allow maintenance of sensitivity of the audio output stage while insuring circuit interchangeability among similar tubes having normal characteristic variations.

*Disclosure*

Figure 1:
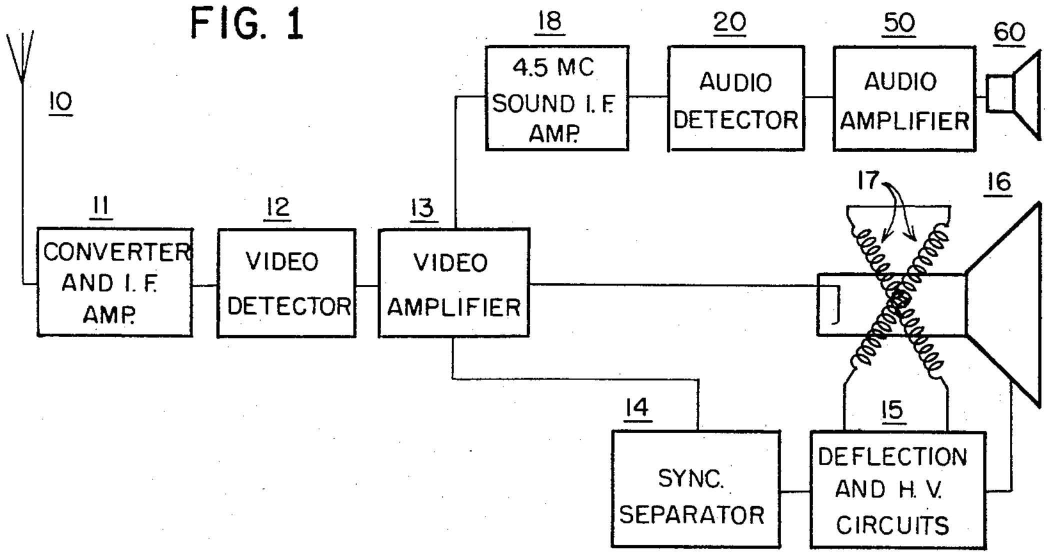

This invention relates generally to television receivers and particularly to audio systems in television receivers.

Recently, there have been numerous improvements in television receiver circuitry with special emphasis being placed upon reducing the number of tube functions and envelopes necessary to adequately produce a television image and its associated audio signal. In the audio section of television receivers great simplifications have been made. For example, today it is not uncommon to merely employ an intermediate frequency sound amplifier, a detector, and an audio output tube whereas in prior years numerous amplification stages were required in this section of the receiver. In practice, the IF sound amplifier may now share a tube envelope with the video amplifier, and the audio detector and output stage may share another tube envelope. The simplification involved should be apparent.

One of the pressing problems in such television receiver audio systems is that of efficiently utilizing the signal output from the detector to drive the audio output stage. Especially where the number of active tube stages has been reduced to a minimum (as in current model receivers) is this particular problem most important.

Initially, this would appear to be a simple problem which might readily be solved by the use of a fixed bias output tube, which, as is well known has excellent signal sensitivity. However, in any mass produced product it is essential to provide for interchangeability between the various components thereof. In particular, with reference to vacuum tubes, interchangeability is enhanced by employing circuitry utilizing large cathode resistors which, in effect, make the tubes "look alike." For example, if a tube has a tendency to draw large currents, the bias across its cathode resistor will increase and reduce this tendency. Likewise, if the tube tends to draw less current, less bias is developed. The net effect is to reduce the "spread" between tubes, which is not done when fixed bias is used. Thus, with cathode bias the plate dissipation characteristics of the tube are normalized due to the effect of the cathode resistor (which is generally substantially bypassed), and because of the slight signal degeneration involved, the linearity of the tube is also improved. However, with a large, unbypassed cathode resistor the signal sensitivity of the stage decreases alarmingly. Hence in order to maintain any semblance of signal sensitivity it has been essential to provide large electrolytic bypass capacitors in parallel with the cathode resistor. The effect of the capacitor is to allow a DC bias on the cathode while substantially maintaining the cathode at AC ground potential, thus keeping the tube within desired plate dissipation limits while not destroying signal sensitivity.

Another way of operating the output tube to achieve a high degree of interchangeability and yet maintain signal sensitivity, without resorting to the use of expensive bypass capacitors, is to force bias a relatively small cathode resistor with a relatively large DC current. Since the cathode resistor is small the signal sensitivity of the tube is not impaired too severely, and the dissipation characteristics of the tube are maintained within fairly narrow limits. However, in order to operate with reasonable cathode resistor current (and hence economically), it is necessary to make the cathode resistor large which, of course, has a deleterious effect on the signal sensitivity. In other words, the cathode resistor cannot be economically reduced to a value where signal degeneration is not objectionable without concomitantly imposing greater restrictions on tube interchangeability.

The circuit of the invention solves this dilemma by utilizing both types of bias for the output tube. In accordance with the preferred embodiment of the invention, a major portion of the bias is developed by forcing current through a cathode resistor of reasonably small value. A smaller portion of the bias is produced by applying a negative potential to the control element of the output tube. With this arrangement it is economically feasible to maintain signal sensitivity while simultaneously insuring a circuit which will accommodate a wide variety of similar type tubes within their proper dissipation ratings.

The circuit is especially well suited for use in conjunction with a quadrature type detector since in such a detector a constant negative voltage of approximately three volts is continuously available. In further accordance with the invention, a connection is made between the junction of the tuned circuit and the RC network connected to the suppressor grid of the quadrature detector, and the control grid of the audio output tube for applying a negative potential thereto. Cathode bias for the audio output tube is also developed by forcing direct current through its unbypassed cathode resistor. Since the presence of the negative potential on the control grid obviates the need for as large a cathode bias as otherwise would be required, the cathode resistor may be reduced in magnitude and hence the signal sensitivity of the output tube may be increased. This is accomplished without requiring the use of signal bypass circuits around the cathode resistor and without substantially affecting the interchangeability characteristics of the tube.

The invention thus provides a more economical audio circuit for a television receiver by proportioning the bias between the control grid and cathode of the audio output tube in a manner such to preserve the signal sensitivity of the tube while retaining the all important interchangeability feature thereof (keeping the tube well within its plate dissipation rating). The resultant circuit when used in conjunction with a quadrature grid detector yields better results at less cost than prior art circuits.

Accordingly, the primary object of the invention is to provide an improved television audio circuit.

Another object of the invention is to provide an audio connection in a television receiver which economically maintains good signal sensitivity.

Still another object of the invention is to provide an audio circuit which eliminates the need for an audio cathode bypass while preserving signal sensitivity and interchangeability of the audio output tube.

A further object of the invention is to provide an improved audio circuit wherein two separate biases are applied to the audio output tube to concurrently maintain its signal sensitivity and dissipation characteristics without necessitating cathode signal bypassing.

A still further object of this invention is to provide a television audio circuit including an audio output tube having an unbypassed cathode resistor, which audio output tube is partially biased from a quadrature type audio detector.

A feature of this invention resides in the proportioning of the biases for the output tube whereby the cathode bias is substantially twice as great as the grid bias to not only maintain the signal sensitivity of the output tube but also allow the requisite degree of interchangeability among similar tube types.

Figure 2:
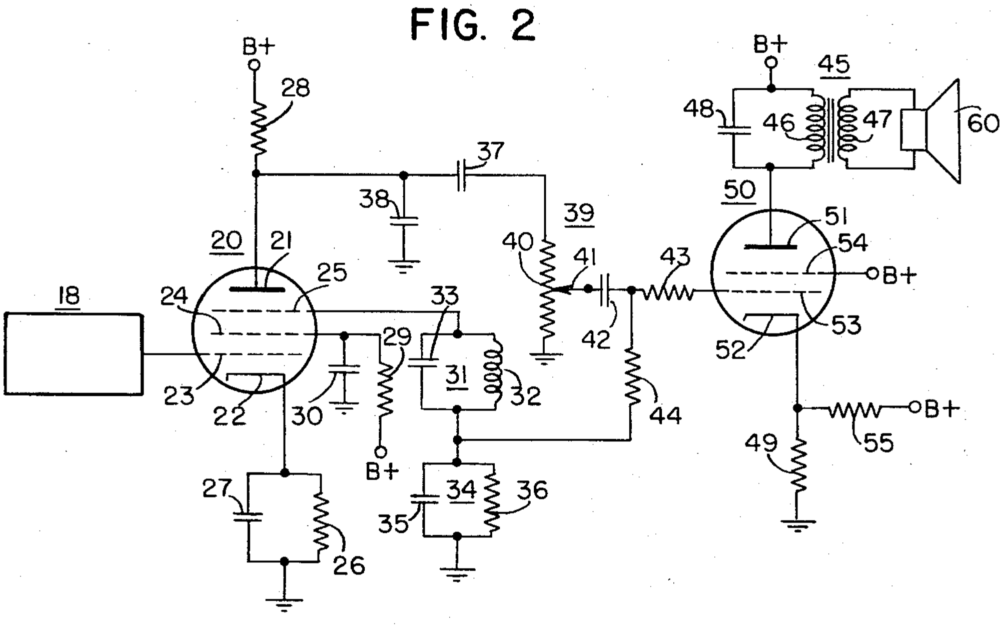

Other objects, features and advantages of this invention will become apparent upon reading the following specification in conjunction with the drawing in which FIG. 1 represents a block diagram of a conventional television receiver and FIG. 2 is a schematic diagram of a portion of FIG. 1.

Referring now to FIG. 1, an antenna 10 is coupled to a block 11 which contains conventional converter and IF amplifier circuitry. Here, in a well known manner, received television signals are converted in frequency to intermediate frequency signals and amplified without loss of any essential information therein. Block 12, labeled VIDEO DETECTOR, contains circuitry for developing a composite video signal including sync signal components and audio information components. Block 13, labeled VIDEO AMPLIFIER, amplifies and separates the video information components, the synchronizing information components and the audio information components. The video information components are applied to picture tube 16, the synchronizing information to block 14 labeled SYNC SEPARATOR, and the audio information to block 18, which is indicated as containing a 4.5 megacycle sound IF amplifier. Block 14 contains circuitry for separating the horizontal and vertical synchronizing information and feeding the separated information to block 15, labeled DEFLECTION AND HIGH VOLTAGE CIRCUITS, which includes circuitry for developing the horizontal and vertical scansion potentials (for windings 17) necessary to sweep the electron beam across the face of picture tube 16, as well as to develop the high operating potentials required thereby.

The amplified sound IF signal received from block 18 is coupled to block 20 labeled AUDIO DETECTOR, which contains circuitry for retrieving the audio information, this information subsequently being applied to block 50, labeled AUDIO AMPLIFIER. Audio amplifier 50 drives a speaker load 60 for reproducing the acoustical accompaniment of the television signal.

The foregoing description has been necessarily brief since the circuitry, functions and all of the elements are individually and collectively well known in the art. It will be readily recognized by those skilled in the art that numerous different circuit configurations may be employed in the individual blocks shown without requiring the exercise of inventive effort.

In FIG. 2, a schematic diagram of the portion of FIG. 1 indicated by blocks 20 and 50 is shown. Block 18 is connected to the input of audio detector 20 which comprises a vacuum tube device including an anode 21, a cathode 22, a control grid 23, a screen grid 24, and a suppressor grid 25. A load resistor 28 is connected between a source of B+ potential and anode 21. An RC network, consisting of a resistor 26 in parallel with a capacitor 27, is connected between cathode 22 and ground and, in a well known manner, provides DC bias for the tube without substantial signal degeneration. Screen grid 24 is connected to B+ through a resistor 29 and bypassed to ground by a capacitor 30. A tuned circuit 31, comprising the parallel combination of an inductor 32 and a capacitor 33, is connected to suppressor grid 25. The other end of tuned circuit 31 is connected to an RC network 34 consisting of the parallel combination of a resistor 35 and a capacitor 36. The other end of RC network 34 is grounded.

Anode 21 is bypassed to ground by a capacitor 38. Anode 21 is also AC coupled to a volume or level control 39 through a coupling capacitor 37. Level control 39 consists of a resistance element 40 and a movable tap 41. For the sake of simplicity, extraneous items such as tone control circuitry are not shown.

Audio amplifier 50 comprises a vacuum tube having an anode 51, a cathode 52, a control grid 53, and a screen grid 54. Movable tap 41 of level control 39 is connected to control grid 53 through a capacitor 42 and a resistor 43. The junction of capacitor 42 and resistor 43 is also connected through a resistor 44 to the junction of tuned circuit 31 and RC network 34. The significance of this connection has been touched upon above and is readily seen as providing a DC path from RC network 34 to control grid 53. An audio output transformer 45, including a primary winding 46 and secondary winding 47, is connected as the audio amplifier load. In this respect primary winding 46 is connected between anode 51 and B+. A capacitor 48 is connected across primary winding 46 for "rolling off" some of the high frequencies and for protecting the transformer in the event the secondary is opened.

Secondary winding 47 of transformer 45 is connected to a speaker 60. Cathode 52 is connected to the junction of a voltage divider network, comprising a resistor 55 and a cathode resistor 49, which network is connected between B+ and ground. The screen grid of audio amplifier 50 is connected to a source of B+. With the exception of the two bias connections, audio amplifier 50 is in all respects conventional.

Referring back to audio detector 20, it will be noted by those skilled in the art that the schematic diagram depicts a conventional locked oscillator quadrature grid type of detector which is in very extensive use in the television field. This arrangement has found favor since it provides detection, amplification, limiting and audio output in a single pentode vacuum tube of relatively straightforward design.

As is well known, in television signals, the separation between the video signal carrier and the audio signal carrier is prescribed by FCC regulation as 4.5 megacycles. The sound subcarrier comprises a frequency modulated wave wherein a 25 kilocycle deviation represents maximum modulation.

The output of block 18 consists of a 4.5 megacycle beat signal which contains the FM modulated audio information. Briefly, the quadrature detector operates in the following manner. Tuned circuit 31 is excited into oscillation by the so-called energy capture by suppressor grid 25 from the anode-cathode conduction current in the pentode. There is, of course, interelectrode capacitance between the suppressor grid and the control grid. This interelectrode capacitance completes a feedback loop, thus enabling the oscillation in the circuit to be self-sustaining at 4.5 megacycles. Oscillation results in the application of an oscillatory potential to suppressor grid 25 which potential is in quadrature with the grid signal when that signal is at its unmodulated frequency. As the control grid signal varies between 4.5 megacycles +25 kc. and 4.5 megacycles minus 25 kc., the phase difference between the suppressor grid and the control grid potentials changes accordingly and the flow of current to anode 21 is controlled. The anode current is proportional to the change in frequency of the input voltage thereby providing detection of the incoming frequency modulated signal. During operation, it will be noted that the junction of tuned circuit 31 and RC network 34 assumes a negative potential of approximately three volts which is substantially constant. This negative potential is utilized in the circuit of the invention for providing a DC bias on control grid 53 of audio amplifier 50.

In a practical embodiment of the invention, detector 20 and audio amplifier 50 may comprise a single tube of, for example, the 6BF11 type. In order to maintain the audio output tube within its proper plate dissipation, limits, a combined bias of approximately −9 volts is utilized. The negative potential available from RC network 34 is on the order of three volts and consequently six volts of bias are developed across cathode resistor 49. With this combination of biases it has been found that the signal sensitivity of the output tube is sufficiently good to enable it to be driven to substantially its full output capability from the signal developed by the quadrature detector. Further, with this arrangement, sufficient cathode bias is developed to provide good interchangeability among tubes without placing stringent requirements on the limits of tube acceptability.

Thus the invention has maintained, and in some cases surpassed, the operational criteria of prior circuits utilizing this basic circuit configuration and tube type without requiring incorporation of an expensive electrolytic capacitor across the cathode resistor. It is understood that numerous modifications and departures from the disclosed embodiment of the circuit may be made by those skilled in the art without departing from the true spirit and scope of the invention as set forth in the claims.

The embodiments of the invention in which an exclusive property or privilege is claimed are defined as follows:

1. A vacuum tube circuit normalizing the signal sensitivity and dissipation characteristics of a plurality of vacuum tubes to provide interchangeability thereamong without necessitating signal bypassing comprising; a direct current potential source; a signal grid circuit input; first bias means producing a negative potential at said signal grid circuit input; an unbypassed cathode resistor; second bias means including said DC potential source producing a unidirectional current through said cathode resistor; and means applying a signal across said signal grid circuit input and said cathode resistor.

2. A vacuum tube circuit as set forth in claim 1 wherein the bias developed across said cathode resistor by said second bias means is substantially twice the bias applied by said first bias means.

3. In combination; a representative vacuum tube having an anode, a cathode, and a control electrode; a cathode resistor connected to said cathode; a load circuit connected to said anode; means applying a signal to said control grid; direct current bias means coupled to said control grid; positive potential means connected to said cathode resistor and developing a voltage thereacross; said direct current bias means and said positive potential means co-operating to establish a bias normalizing the signal sensitivity and dissipation criteria for said representative vacuum tube without necessitating a signal bypass cathode capacitor.

4. In combination; a television receiver including a quadrature sound detector and a sound output tube; a level control; means coupling the output of said quadrature detector across said level control; first bias means in said quadrature detector deriving a constant negative bias potential responsive to energization of said quadrature detector; an unbypassed signal input circuit for said output tube; second bias means force biasing a portion of said input circuit; and means connecting said level control and said first bias means to said input circuit whereby a portion of the bias for said output tube is provided by said second bias means and a lesser portion of the bias for said output tube is provided by said first bias means in said quadrature detector.

5. In combination in a television receiver including a quadrature type audio detector, a volume control, and an audio output tube; means coupling the output of said audio detector to said volume control; a cathode and control grid in said audio output tube; an unbypassed cathode resistor connected to said cathode; a direct current potential source; means connecting said direct current potential source to said cathode resistor for developing a first bias voltage thereacross; means in said quadrature detector producing a source of negative potential; means coupling said source of negative potential to said control grid and producing a second bias voltage for said audio output tube; and means coupling said volume control to said control grid.

6. In a television receiver; a quadrature sound detector vacuum tube having an output circuit and including a suppressor grid having a tuned circuit coupled thereto; an RC network coupled between said tuned circuit and a source of reference potential; means energizing said quadrature detector for producing a demodulated audio signal in said output circuit and an oscillatory signal in said tuned circuit, said RC network developing a substantially constant direct current potential negative with respect to said reference potential; an audio output tube including a control grid and a cathode; a cathode resistor connected between said cathode and said source of reference potential; means forcing current through said cathode resistor and establishing a first steady state bias potential for said audio output tube; means coupling said output circuit to said control grid; and means direct current coupling said RC network to said control grid for applying a second steady state bias potential to said audio output tube, the ratio of said bias potentials being selected to obviate the need for a cathode resistor signal bypass without substantially degrading the signal sensitivity and dissipation characteristics of said audio output tube.

7. In a television sound system of the type including a quadrature detector demodulating the audio signal and coupling the demodulated audio signal through a level control to an audio output tube, an oscillatory tank circuit coupled to a control element of the quadrature detector and returned to a source of reference potential through a negative voltage developing RC network; the improvement comprising in combination; a direct current connection between said RC network and said control electrode for applying a first bias to said audio output tube; a cathode resistor connected between the cathode of said audio output tube and said source of reference potential; and means forcing direct current through said cathode resistor for developing a second bias potential for said audio output tube; the ratio of said bias potentials being chosen to optimize signal sensitivity and dissipation characteristics of said audio output tube.

References Cited

UNITED STATES PATENTS

| | | | |
|---|---|---|---|
| 3,313,882 | 4/1967 | Loughlin | 178—7.5 |
| 2,782,266 | 2/1957 | Belar | 330—204 X |

ROBERT L. GRIFFIN, *Primary Examiner.*

JOHN W. CALDWELL, *Examiner.*

R. L. RICHARDSON, *Assistant Examiner.*